(No Model.)
J. PERKINS.
HOSE REEL.
No. 363,479. Patented May 24, 1887.
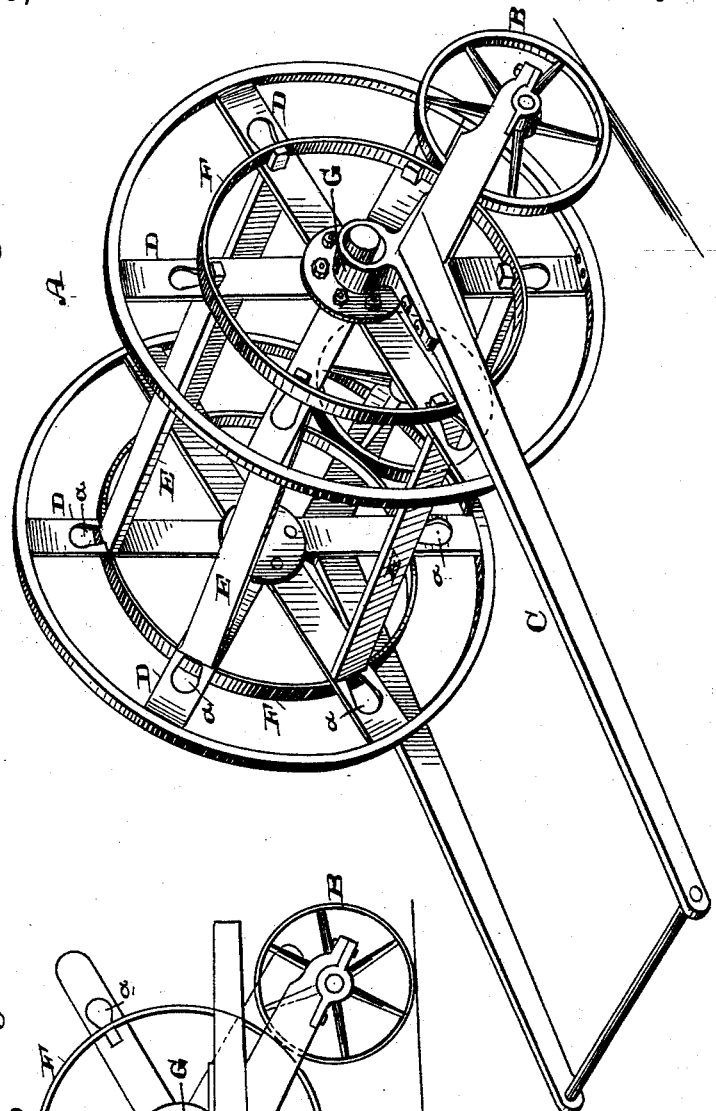
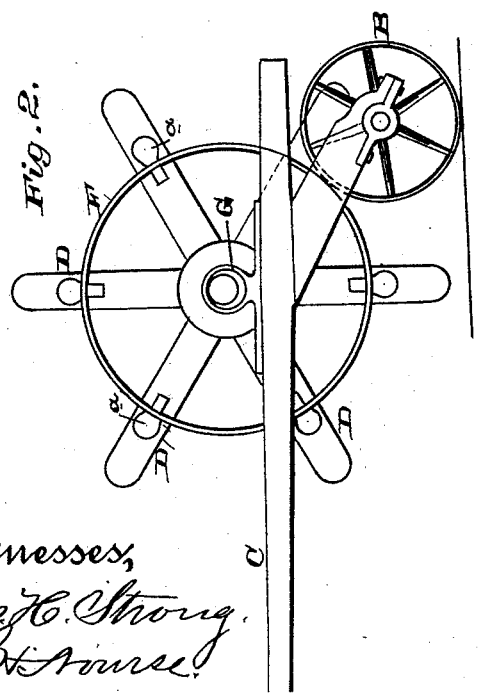

UNITED STATES PATENT OFFICE.

JOSEPH PERKINS, OF SAN FRANCISCO, CALIFORNIA.

HOSE-REEL.

SPECIFICATION forming part of Letters Patent No. 363,479, dated May 24, 1887.

Application filed February 28, 1887. Serial No. 229,257. (No model.)

*To all whom it may concern:*

Be it known that I, JOSEPH PERKINS, of the city and county of San Francisco, State of California, have invented an Improvement in Hose-Reels; and I hereby declare the following to be a full, clear, and exact description of the same.

My invention relates to certain improvements in reels for winding hose and in a means for supporting and driving the same, all of which will be more fully explained by reference to the accompanying drawings, in which—

Figure 1 is a view of my device. Fig. 2 is a modification.

The object of my improvement is to mount the reel upon the truck which supports it so that when the truck is in position to be wheeled from place to place the bearing-wheels of the truck serve to support the rims of the hose-reel and cause it to rotate without the use of intermediate gearing of any kind, the rotation being at the same rate as that of the advance of the truck, whether the wheels of the latter be large or small.

A is the reel upon which the hose is to be wound.

B are the bearing or supporting wheels of the apparatus, which are journaled at the lower end of a bent or angularly-shaped frame, C, the upper end of which serves as handles or arms by which to wheel the truck.

The reel may be made without exterior rims, but, as in Fig. 1, is preferably formed with rims, each having broad spokes D extending radially from a small hub to the rims, and through these spokes slots *a* are made at a suitable distance from the center to receive transverse slats or bars E, upon which the hose is to be wound. These bars extend through the spokes D, and have rims or tires F placed upon their projecting ends; and it will be seen that these tires are of the same diameter as the reel portion upon which the hose is to be wound up. These rims or tires are in such position with relation to the small wheels B that they come in contact with their rims, and when the reel-frame C is turned into position to wheel the truck the hose-reel will be directly above the wheels B and the whole weight of the reel and the hose upon it will rest upon the rims of these wheels.

In order to allow this to be done, I make the journal-boxes G, in which the projecting ends of the hubs of the reel turn, larger in diameter than these projecting trunnions or shafts, so that there will be considerable play in the boxes. This allows the whole weight of the reel and the contained hose to rest upon the bearing-wheels B, and it will be manifest that when the truck is moved along, these bearing-wheels support the reel and really form a movable surface, upon which the reel rolls in the same manner that it might roll upon the ground if it were not mounted upon the truck. The operation will then be as follows: The end of the hose being attached to the hydrant, by drawing the truck along, the reel will be caused to rotate just as fast as the truck moves over the ground until the proper quantity of hose has been unwound. The end upon which the nozzle is to be placed projects through one of the trunnions of the reel, which is made hollow for that purpose. When the hose is to be again wound up, the truck is pushed toward the hydrant, and as the reel is supported upon the bearing-wheel rims it will be caused to rotate just as fast as the truck moves toward the hydrant, and will thus take the hose up and wind it smoothly upon the reel. If, however, any difference in movement occurs, the rims will readily slip over each other sufficiently to allow for this.

By constructing my reel in this way no axle extending through from one end to the other is necessary, each hub having short exterior projections to serve as journals, the slats which unite the radial spokes of the two sides of the reel forming all the connection that is necessary.

Having thus described my invention, what I claim as new, and desire to secure by Letters Patent, is—

1. The hose-reel consisting of the independent hubs and radial arms united by bars extending between the pairs of arms equidistant from the center, said bars extending through to the outside of the spokes and having rims attached thereto, in combination with the wheels of the truck upon which the reel is supported, so that these rims travel upon the tops of the bearing-wheels, substantially as herein described.

2. The hose-truck having the bearing-wheels, a frame or handles having journal-boxes arranged thereon, in combination with a hose-reel having rims which travel in contact with the bearing-wheels and journals made of smaller diameter than the journal-boxes in which they are fitted, substantially as herein described.

In witness whereof I have hereunto set my hand.

JOSEPH PERKINS.

Witnesses:
S. H. NOURSE,
JAMES MASON.